(12) United States Patent
Ali et al.

(10) Patent No.: US 12,446,071 B2
(45) Date of Patent: Oct. 14, 2025

(54) BEAM SWITCHING AFTER PERFORMING LISTEN-BEFORE-TALK

(71) Applicant: Lenovo (Singapore) PTE. LTD., New Tech Park (SG)

(72) Inventors: Ali Ramadan Ali, Munich (DE); Ankit Bhamri, Rödermark (DE); Karthikeyan Ganesan, Nauheim (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 376 days.

(21) Appl. No.: 17/906,133

(22) PCT Filed: Mar. 11, 2021

(86) PCT No.: PCT/IB2021/052052
§ 371 (c)(1),
(2) Date: Sep. 12, 2022

(87) PCT Pub. No.: WO2021/181336
PCT Pub. Date: Sep. 16, 2021

(65) Prior Publication Data
US 2023/0104600 A1 Apr. 6, 2023

Related U.S. Application Data

(60) Provisional application No. 62/988,360, filed on Mar. 11, 2020.

(51) Int. Cl.
*H04W 74/0816* (2024.01)
*H04W 16/28* (2009.01)

(52) U.S. Cl.
CPC ....... *H04W 74/0816* (2013.01); *H04W 16/28* (2013.01)

(58) Field of Classification Search
CPC ............. H04W 74/0816; H04W 16/28; H04W 74/0808
See application file for complete search history.

(56) References Cited

U.S. PATENT DOCUMENTS

| 10,986,617 B2 | 4/2021 | Cheng et al. | |
| 2019/0230706 A1* | 7/2019 | Li | H04W 88/08 |

(Continued)

FOREIGN PATENT DOCUMENTS

| WO | 2019173365 A1 | 9/2019 |
| WO | 2019195465 A1 | 10/2019 |

OTHER PUBLICATIONS

PCT/IB2021/052052, "Notification of Transmittal of the International Search Report and the Written Opinion of the International Searching authority, or the Declaration", International Searching Authority, Jun. 29, 2021, pp. 1-15.

(Continued)

*Primary Examiner* — Ayanah S George
(74) *Attorney, Agent, or Firm* — Kunzler Bean & Adamson

(57) ABSTRACT

Apparatuses, methods, and systems are disclosed for receiver-assisted interference mitigation. One apparatus includes a processor and a transceiver that is operable on unlicensed spectrum, where the transceiver includes a plurality of UE panels. The processor generates a first TB for a first UL channel resource. Here, the first TB contains control signaling or data. The processor performs a directional LBT procedure for a first panel associated with the first UL channel resource and transmits request information to a RAN node using the first UL channel resource in response to successful directional LBT. The processor receives feedback information from the RAN node in response to the request information and transmits the first TB using the first (Continued)

UL channel resource in response to receiving the feedback information.

19 Claims, 9 Drawing Sheets

(56) References Cited

U.S. PATENT DOCUMENTS

2019/0394786 A1* 12/2019 Parron .................... H04W 4/46
2020/0314829 A1* 10/2020 Venugopal ............ H04W 16/28

OTHER PUBLICATIONS

Samsung, "Channel access procedures for NR-U", 3GPP TSG-RAN WG1 Meeting #99 R1-1912449, Nov. 18-22, 2019, pp. 1-13.
Intel Corporation, "New SID: Study on supporting NR from 52.6GHz to 71 GHZ ", 3GPP TSG RAN Meeting #86 RP-193259, Dec. 9-12, 2019, pp. 1-3.

* cited by examiner

BEAM SWITCHING AFTER PERFORMING LISTEN-BEFORE-TALK

CROSS-REFERENCE TO RELATED APPLICATIONS

This application claims priority to U.S. Provisional Patent Application No. 62/988,360 entitled "INTERFERENCE MITIGATION IN DIRECTIONAL LISTEN-BEFORE-TALK" and filed on Mar. 11, 2020 for Ali Ramadan Ali, Ankit Bhamri, and Karthikeyan Ganesan, which application is incorporated herein by reference.

FIELD

The subject matter disclosed herein relates generally to wireless communications and more particularly relates to receiver-assisted interference mitigation technique in directional Listen-Before-Talk ("LBT").

BACKGROUND

In certain wireless communication systems, service is supplemented by operation on unlicensed spectrum. However, operation on unlicensed spectrum requires Clear Channel Assessment ("CCA") prior to transmission, for example involving a LBT procedure.

In Third generation Partnership Project ("3GPP") New Radio in Unlicensed Spectrum ("NR-U"), channel access in both downlink ("DL") and uplink ("UL") relies on the CCA (e.g., LBT procedure) to gain channel access. Prior to any transmission, the gNB (i.e., 5th generation ("5G") base station) and/or the User Equipment ("UE") must first sense the channel to find out whether there are ongoing communications on the channel No beamforming is considered for LBT in NR-U in Release 16 ("Rel-16") and only omni-directional LBT is assumed.

BRIEF SUMMARY

Disclosed are procedures for receiver-assisted interference mitigation. Said procedures may be implemented by apparatus, systems, methods, or computer program products.

One method of a UE includes generating a first transport block ("TB") for a first uplink ("UL") channel resource, the first TB comprising one of: control signaling and data and performing a directional Listen-Before-Talk ("LBT") procedure for a first beam and/or panel associated with the first UL channel resource. The method includes transmitting request information to a Radio Access Network ("RAN") node using the first UL channel resource in response to successful directional LBT and receiving feedback information from the RAN node in response to the request information. The method includes transmitting the first TB using the first UL channel resource in response to receiving the feedback information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
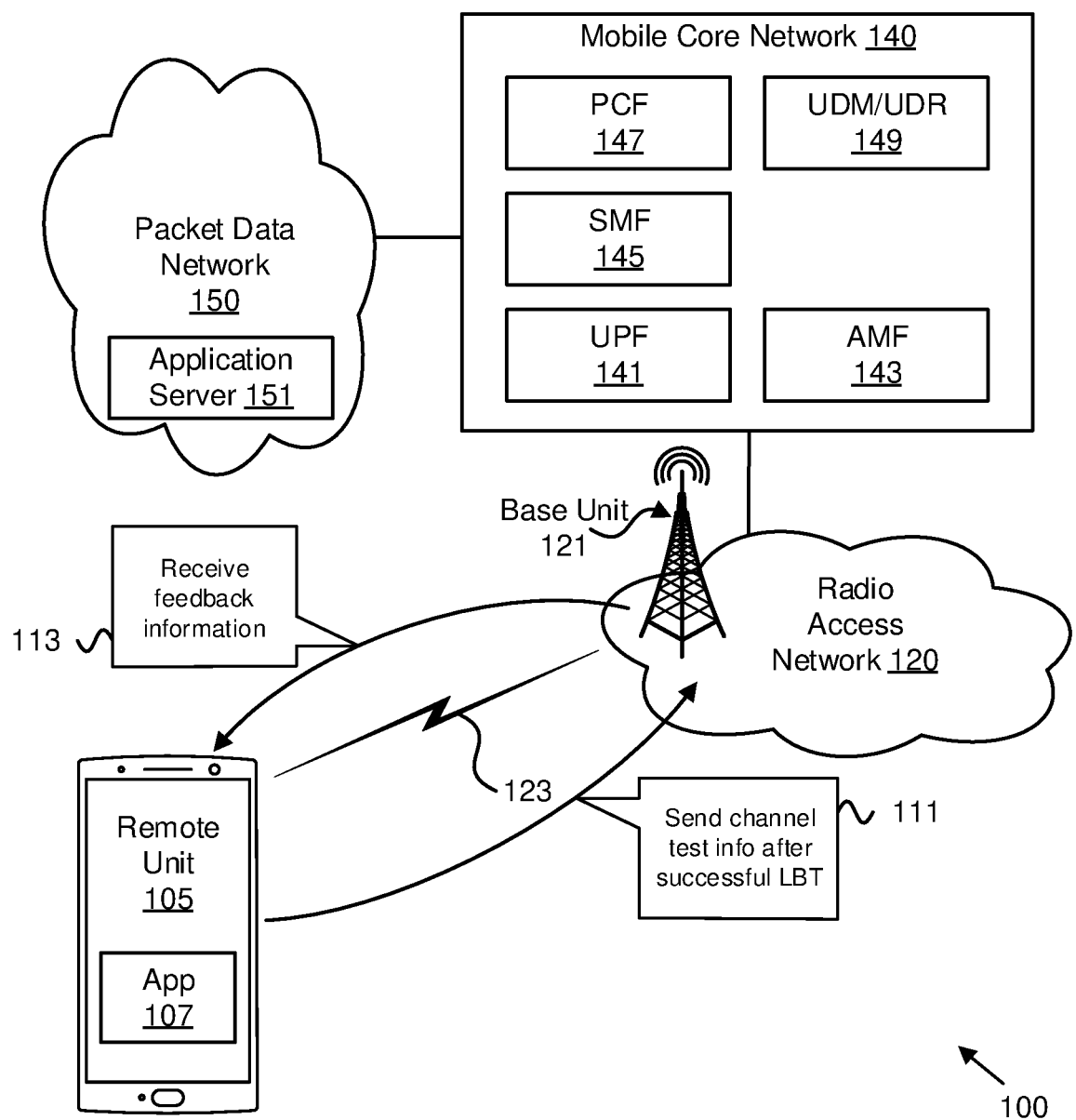
FIG. 1 is a schematic block diagram illustrating one embodiment of a wireless communication system for receiver-assisted interference mitigation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for receiver-assisted interference mitigation listen-before-talk ("LBT"). The present disclosure describes solutions for interference mitigation for UL channel access in unlicensed band for high frequency range (i.e., above 24 GHz). The disclosed solutions to allow a receiving node to assist the transmitting node in selecting the proper panel(s)/beam(s) to avoid directional interference at the receiving node.

The present disclosure deals with the channel access mechanism in unlicensed band for high frequency range—namely, Frequency Range 2 ("FR2", i.e., including includes frequency bands from 24.25 GHz to 52.6 GHz) and beyond. More specifically, as beam-based operation is assumed for unlicensed spectrum in FR2 and beyond, it is crucial to perform LBT in a specific beam direction(s) rather than omni-directional LBT.

As beam-based transmission is assumed for unlicensed spectrum in FR2 and beyond, the interferers such as Wi-Fi access points and/or other NR networks working at these bands would also have directional transmission. Performing LBT only for the transmitting node (e.g., UE for uplink ("UL") transmission or gNB for downlink ("DL") transmission) may not guarantee a free-of-interference reception due to hidden nodes to the transmitter. The "hidden node" issue (also referred to as "hidden beam") is that due to the directional nature of beam communication, an interfering node may be transmitting in the direction the receiver node (i.e., UE for DL communication or gNB for UL communication) but directional LBT in the direction of the receiver node by the transmitting node will not detect the interfering node.

In NR-U, channel access in both downlink and uplink relies on the LBT; however, no beamforming is considered for LBT in NR-U in Rel. 16 and only omni-directional LBT is assumed. The NR-U LBT procedures for channel access can be summarized as follows:

Both gNB-initiated and UE-initiated Channel Occupant Times ("COTs") use Category 4 ("Cat-4") LBT where the start of a new transmission burst always perform LBT with exponential back-off. Only with exception, when the DRS must be at most one ms in duration and is not multiplexed with unicast PDSCH. As used herein, a Cat-4 LBT procedure refers to LBT with a random back-off and with a variable size contention window.

UL transmission within a gNB initiated Channel Occupancy Time ("COT") or a subsequent DL transmission within a UE or gNB initiated COT can transmit immediately without sensing only if the gap from the end of the previous transmission is not more than 16 μs, otherwise Category 2 ("Cat-2") LBT must be used and the gap cannot exceed 25 μs. As used herein, a Cat-2 LBT procedure refers to LBT without random back-off.

In various embodiments, a UE may include multiple antenna panels. An identifier (ID) that can be used at least for indicating panel-specific UL transmission is supported. The ID may be defined considering the possibility to reuse/modification of Rel-15 specification support or introducing new ID. In certain embodiments, the UE is not required to explicitly disclose its UL antenna panel implementation. In other embodiments, UE capability signaling may be used for panel-specific UL transmission.

A panel identifier ("ID") to be used at least for indicating panel-specific UL transmission may include one of the following: 1) an Sounding Reference Signal ("SRS") resource set ID; 2) an ID, which is directly associated to a reference RS resource and/or resource set; 3) an ID, which can be assigned for a target Reference Signal ("RS") resource and/or resource set; and 4) an ID which is additionally configured in spatial relation information. The panel ID (not excluding to reuse existing ID) may be used for panel-selection-based transmission of Physical Uplink Shared Channel ("PUSCH"), Physical Uplink Control Channel ("PUCCH") and SRS, among multiple activated panels.

In some embodiments, multiple panels are implemented on a UE and only one panel can be activated at a time, with a predetermined panel switching/activation delay. In some embodiments, multiple panels are implemented on a UE and multiple panels can be activated at a time and one or more panels can be used for transmission. In some embodiments, multiple panels are implemented on a UE and multiple panels can be activated at a time but only one panel can be used for transmission. Note that this does not require a UE to always activate multi-panels simultaneously. Also note that the UE can control the panel activation/deactivation.

In other embodiments, a new panel ID may be used, which can be implicitly/explicitly applied to the transmission for a target RS resource or resource set, for PUCCH resource, for SRS resource. In such embodiments, a panel specific signaling is performed using the new panel ID implicitly (e.g., by DL beam reporting enhancement) or explicitly. If explicitly signaled, the ID can be configured in the target RS/channel or reference RS (e.g., in the DL RS resource configuration or in spatial relation info).

As used herein, a "UE panel" refers to a logical entity that may be mapped to physical UE antennas. For certain condition(s), the gNB can assume the mapping between the UE's physical antennas to the logical entity "UE panel" activated for transmission will not be changed. Depending on the UE's own implementation, a "UE panel" can have at least the following functionality as an operational role of Unit of antenna group to control its Tx beam independently.

According to solutions of the disclosure, a RAN Node (i.e., gNB or 5G base station) sends to the UE a Radio Resource Control ("RRC") message to configure a plurality of PUCCH/PUSCH resources, where the spatial relation for the corresponding Physical Uplink Control Channel ("PUCCH") resources is initiated/updated by MAC Control Element ("CE") and the spatial relation for the corresponding Physical Uplink Shared Channel ("PUCCH") is established based on either SRS/PUCCH or any of the DL RS. Here, the RRC message is UE-specific. Each PUCCH/PUSCH resource is associated with a panel/beam at the UE and each PUCCH/PUSCH is transmitted with at least some request information before transmitting the actual control/data on PUCCH/PUSCH.

After a UE performs directional CCA/LBT for each transmit ("Tx") panel/beam, and before transmitting PUCCH/PUSCH control/data, the UE transmits request information using a plurality of PUCCH/PUSCH signals using multiple PUCCH/PUSCH resources associated with multiple beams/panels to help the gNB identify the interference corresponding to each UE Tx panel. Where PUCCH/

PUSCH contains information related to the transmission such as UE ID, beam ID and/or panel ID, Configured Grant ("CG") resource configuration, Channel access priority class, LBT type, etc. to be used by the receiver. Only after the gNB responds back with at least some feedback information on either PDCCH/PDSCH on at least one of the beams/panels, then only UE initiates with actual transmission.

According to solutions of the disclosure, a timer that is either semi-statically or dynamically configured/indicated to the UE. This timer allows the UE to wait for a definite time to receive the response from the gNB that the channel is clear from receiver point of view on at least one of the beams/panels to receive UL transmission from the UE.

FIG. 1 depicts a wireless communication system 100 for receiver-assisted interference mitigation, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the remote unit 105 may send channel test information 111 to the remote unit 105, wherein the RAN 120 sends a feedback information 113 to the remote unit 105.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF")141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for receiver-assisted interference mitigation apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

The remote unit 105 is configured with multiple transmit ("Tx") panels either during initial access or in the connected mode using SRI. As used herein, a "Tx panel" (also referred to as UE panel) refers to a logical entity that may be mapped to physical remote unit 105 antennas. For certain condition(s), the gNB can assume the mapping between UE's physical antennas to the logical entity Tx panel activated for transmission will not be changed. Depending on the remote unit 105 implementation, a Tx panel can have at least the functionality as an operational role of Unit of antenna group to control its Tx beam independently. Note that the base unit 121 may also be configured with multiple receive ("Rx") panels, i.e., logical entities that may be mapped to physical antennas of the base unit 121 used to directionally receive a signal from the remote unit 105.

The remote unit 105 receives from the base unit 121, a UE-specific RRC message to configure a plurality of PUCCH/PUSCH resources, where the spatial relation for the corresponding PUCCH resources is initiated/updated by MAC Control Element ("CE") and the spatial relation for the corresponding PUSCH is established based on either SRS/PUCCH or any of the DL RS. Each PUCCH/PUSCH resource is associated with a panel/beam at the remote unit 105 and each PUCCH/PUSCH is transmitted with at least some request information before transmitting the actual control/data on PUCCH/PUSCH.

Accordingly, after the remote unit 105 performs directional CCA/LBT for each Tx panel/beam, and before transmitting PUCCH control signaling messages and/or PUSCH data, the remote unit 105 transmits channel test information 111 (e.g., request information or SRS-like sequence) to the base unit 121 using a plurality of PUCCH/PUSCH/SRS signals and using multiple PUCCH/PUSCH/SRS resources associated with multiple beams/panels. The transmitted channel test information 111 allows the base unit 121 to identify the interference corresponding to each remote unit 105 Tx panel. In certain embodiments, the channel test information 111 in the PUCCH/PUSCH/SRS signals contains information related to the transmission such as UE ID, Beam ID/Panel ID, CG resource configuration, Channel access priority class, LBT type, etc. to be used by the receiver. In various embodiments, the remote unit 105 initiates the actual PUCCH/PUSCH transmission only after the base unit 121 responds back with at least some feedback information 113, e.g., on either PDCCH/PDSCH on at least one of the beams/panels.

According to a first solution, the remote unit 105 requests set of Tx panels IDs to be used for a PUSCH configured grant ("CG") transmission. After performing LBT successfully on a set of panels, the remote unit 105 transmits request information (i.e., channel test information 111) in the form of PUCCH on the configured PUCCH resources using plurality of panels/beams.

According to a second solution, the base unit 121 sends feedback information 113 to the remote unit 105 that indicates the set of Tx panel IDs to be used for PUSCH and also indicates different configured grant ("CG") resources.

According to a third solution, the remote unit 105 repeats the request transmission in the case of base unit 121 feedback loss or insufficient feedback for Tx panel selection.

According to a fourth solution, the remote unit 105 may mitigate interference by transmitting muting information to neighboring transmitters.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting measurement reporting in non-public networks.

Figure 2:
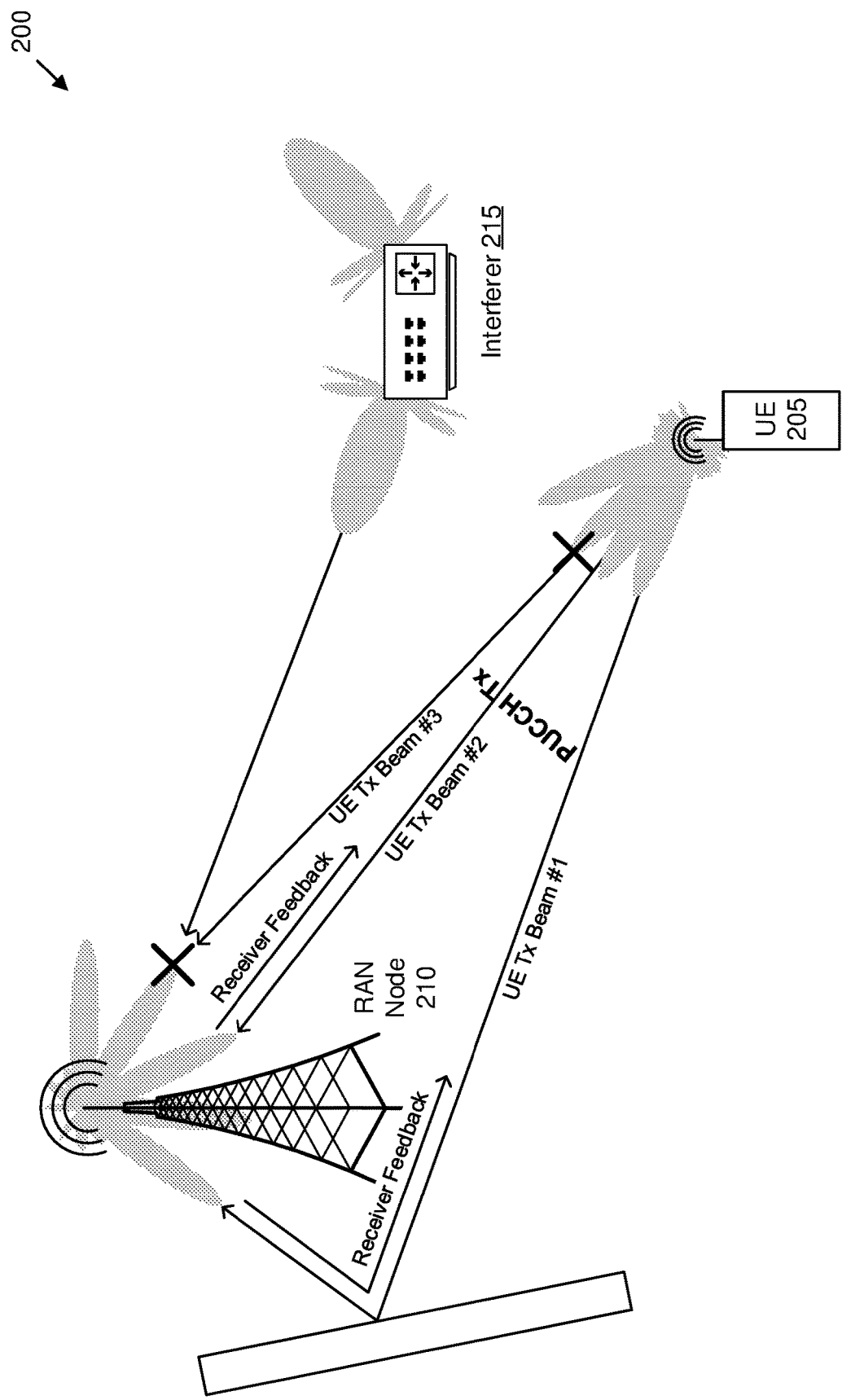
FIG. 2 is a diagram illustrating one embodiment of interference mitigation for directional LBT.

FIG. 2 depicts a scenario 200 for receiver-assisted interference mitigation technique in directional LBT, according to embodiments of the disclosure. The scenario 200 involves a UE 205 (which may be one implementation of the remote unit 105), a RAN node 210 (which may be one implementation of the base unit 121), and an interferer 215.

As depicted, the interferer 215 causes interference at the RAN node 210 for at least one beam of the UE 205 (i.e., UE Tx Beam #3), thus negatively impacting UL transmission from the UE 205 (i.e., PUCCH transmission, PUSCH transmission, etc.). However, because of the directional nature of beam communication, LBT may succeed at the UE 205 for UE Tx Beam #3. If the UE 205 were to transmit PUCCH control signaling and/or PUSCH data using UE Tx Beam #3, the RAN node 210 may be unable to correctly receive and decode the PUCCH/PUSCH due to hidden node interference caused by the interferer 215.

To mitigate the interference, the UE 205 may transmit request information on each PUCCH/PUSCH before transmitting the actual control/data on PUCCH/PUSCH. In response to correctly receiving (i.e., successfully receiving and decoding) the request information, the RAN node 210 responds by sending feedback information, e.g., on a DL beam corresponding to the received UL beam. As depicted in FIG. 2, the RAN node 210 successfully receives and decodes request information sent on UE Tx Beam #1 and UE Tx Beam #2. However, the request information sent on UE Tx Beam #3 is not received correctly at the RAN node 210, so no receiver feedback is sent corresponding to UE Tx Beam #3.

Only after the gNB responds back with at least some feedback information on either PDCCH/PDSCH on at least one of the beams/panels, does the UE 205 initiate the actual control/data transmission. In the scenario 200, the UE 205 may transmit a PDCCH/PDSCH TB on at least one of UE Tx Beam #1 and UE Tx Beam #2, e.g., in response to the feedback information.

In certain embodiments, instead of request information, the UE 205 may transmit an SRS or SRS-like signal from each panel of the UE. In one embodiment, the sequence of the SRS-like signal is configured by the UE-specific RRC message.

One benefit of the proposed solutions is to avoid interference to PUSCH data at the gNB. The UE 205 and the RAN node 210 collaborate to select the best UE Tx panel(s)/beam(s) that guarantee free-of-interference UL data reception. The UE 205 gets pre-information about the quality of the UL channel before sending the actual UL data in order to enhance the UL quality, especially for CG transmission.

Figure 3:
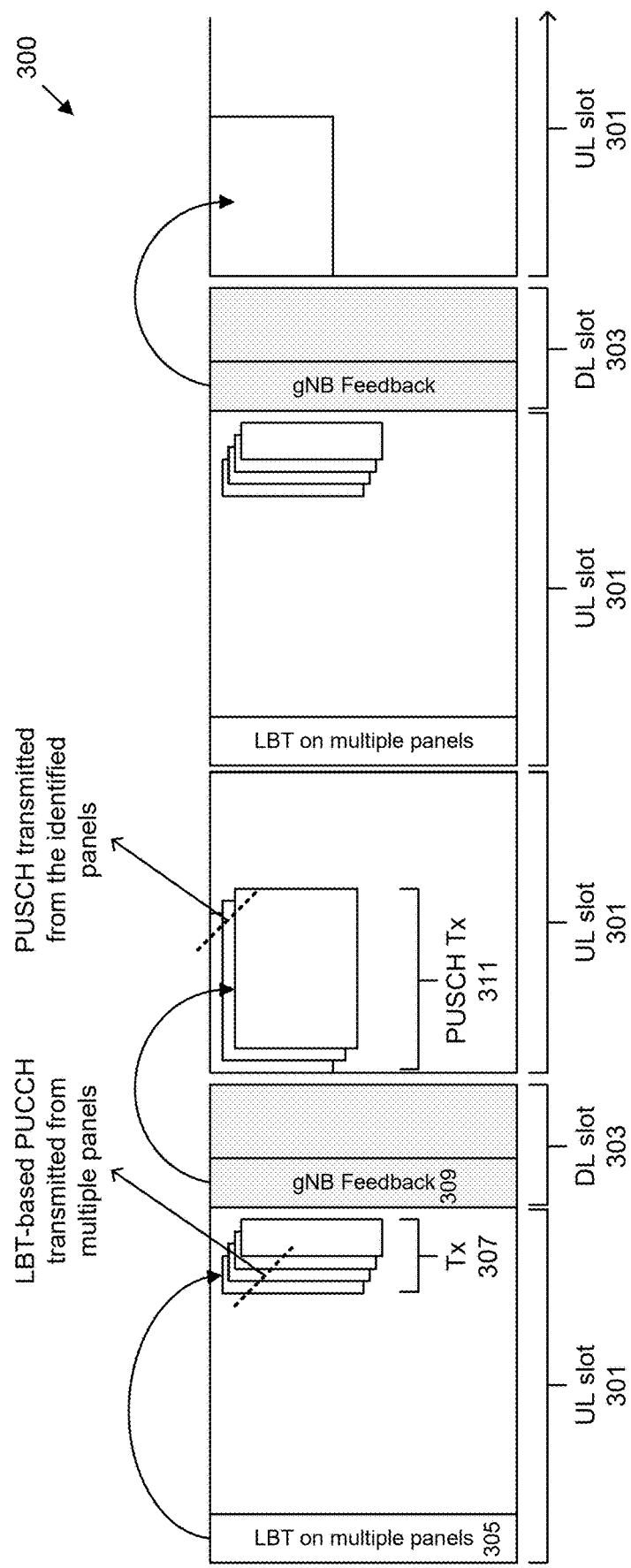
FIG. 3 is a diagram illustrating one embodiment of receiver-assisted interference mitigation in directional LBT.

FIG. 3 depicts a sequence of NR-U slots 300 for receiver-assisted interference mitigation technique in directional LBT, according to embodiments of the disclosure. The UE 205 may transmit during the UL slots 301 and the RAN node 210 (e.g., a gNB) may transmit during the DL slots 303. FIG. 3 illustrates one example of the first solution for receiver-assisted interference mitigation.

According to the first solution, the UE 205 sends the request information such as beam ID and/or panel ID, CG resource configuration, Channel access priority class, LBT type, etc. to be used by the receiver. In various embodiments of the first solution, the UE 205 autonomously selects panel(s)/beam(s) for performing LBT based on the measurement of DL signals e.g., SSB, CSI-RS.

After performing LBT successfully on a set of panels, the UE 205 transmits the request information in the form of PUCCH 307 on the configured PUCCH resources using plurality of panels/beams. In certain embodiments, the PUCCH signal 307 is a sequence (similar PUCCH format 0/1 for Scheduling Resource ("SR") or ACK/NACK). In certain embodiments, the PUCCH signal 307 is scrambled with the panel/beam ID. In another implementation, the PUCCH signal 307 contains a DM-RS signal, where the DM-RS signal sequence is based on the panel/beam index. The RAN node 210, upon receiving PUCCH signals 307 transmitted by one or more panels of a UE 205, then transmits feedback 309 that includes the IDs of the decoded PUCCH signals. The UE 205 uses the feedback 309 containing selected panels for further UL data transmission (e.g., to send the actual control/data transmission).

In certain embodiments, on the set of beams/panels that are selected after the LBT success, the UE 205 simultaneously transmits one or more values of the above values transmitted as part of the request information. After the request bit(s) are sent on multiple panels/beams, then the UE 205 waits to receive the feedback 309 on at least one of the beams/panels. In one embodiment, only a single timer is configured for the UE 205 to receive at least one feedback 309 from the RAN node 210.

In other embodiments, the UE 205 sends the request information sequentially on a set of beams/panels that are selected after the LBT success. After the request bit(s) is sent on first panel/beam, then UE 205 waits for the corresponding feedback 309 for the configured amount of time. If UE 205 does not receive any feedback from the RAN node 210 within the configured time, then the UE 205 sends the request bit(s) again on another panel and beam and follows the same procedure.

In one implementation of the first solution, instead of PUCCH transmission, PUSCH can also be transmitted and the request information could be part of aperiodic uplink control information ("A-UCI") or Medium Access Control ("MAC") Control Element ("CE"). In another implementation of the first solution, the request signal may also be based on sequence detection method, where a sequence is associated with each panel of the UE via RRC configuration. For example, the sequence may also be an SRS, where each panel is associated with a dedicated SRS resource.

Figure 4:
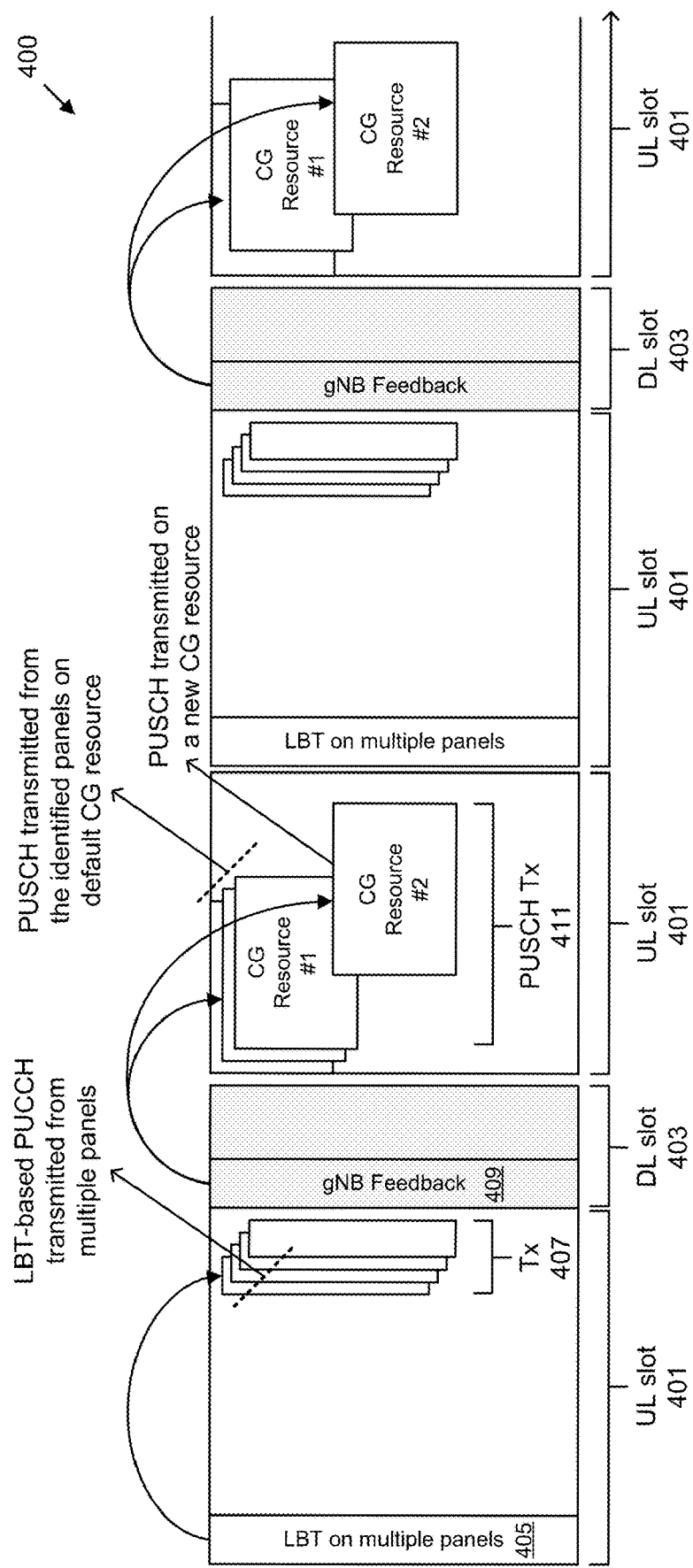
FIG. 4 is a diagram illustrating another embodiment of receiver-assisted interference mitigation in directional LBT.

FIG. 4 depicts a sequence 400 of NR-U slots for receiver-assisted interference mitigation technique in directional LBT, according to embodiments of the disclosure. The UE 205 may transmit during the UL slots 401 and the RAN node 210 (e.g., a gNB) may transmit during the DL slots 403. FIG. 4 illustrates one example of the second solution for receiver-assisted interference mitigation.

According to the second solution, the UE 205 selects the panels for performing LBT based on the measurement of DL signals e.g., SSB, CSI-RS. After performing LBT 405 on a set of panels, the UE 205 transmits short format PUCCH 407 from the panels with successful LBT.

Upon receiving PUCCH signals 407 from one or more UE panels, the RAN node 210 reports feedback 409 includes the IDs of the decoded PUCCH signals 407 and the new CG resources to be used for PUSCH transmission. In certain embodiments, the RAN node 210 signals the feedback 409 by a single format DCI that contains a bit map for the selected Tx panels/beams and a new CG resource configuration field. The UE 205 performs PUSCH transmission 411 using the selected panels and the new configured CG resources for UL data.

In one implementation of the second solution, the RAN node 210 sends feedback 409 on one or more DL beams that are corresponding to the UL beams where the request sent by the UE 205 was successful. In this case, the RAN node 210 does not need to explicitly inform the UE 205 about the beams/panels where the request transmission/reception was successful.

According to the third solution, if the UE 205 does not receive a feedback 409 from the RAN node 210, or the feedback 409 did not contain Tx panel IDs (e.g., because no PUCCH signals 407 were decoded at the RAN node 210), or a timer for feedback reception was elapsed, the UE 205 may again transmit the request transmission, e.g., after a random back-off time.

According to the fourth solution, upon receiving the RAN node 210 feedback 409 of the selected panels and CG resources, the UE 205 may transmit muting information to one or more neighboring UEs in group common Physical Sidelink Control Channel ("PSCCH") or Physical Sidelink Shared Channel ("PSSCH"), where a field in the SCI indicates the muting indicator and also the time period or Maximum COT ("MCOT") duration/Channel access priority class value. The sidelink message may include the selected CG resources by the requesting UE 205, UE ID, Channel access priority class/MCOT duration, spatial filter related to RAN node transmission/reception which could be based on SSB, CSI-RS, etc.

In another implementation, the UE 205 reduce the latency by transmitting a group common PSCCH or PSSCH in sidelink prior to transmitting a request message to gNB (i.e., PUCCH signals 407) and/or prior to receiving feedback 409 from the RAN node 210.

Figure 5:
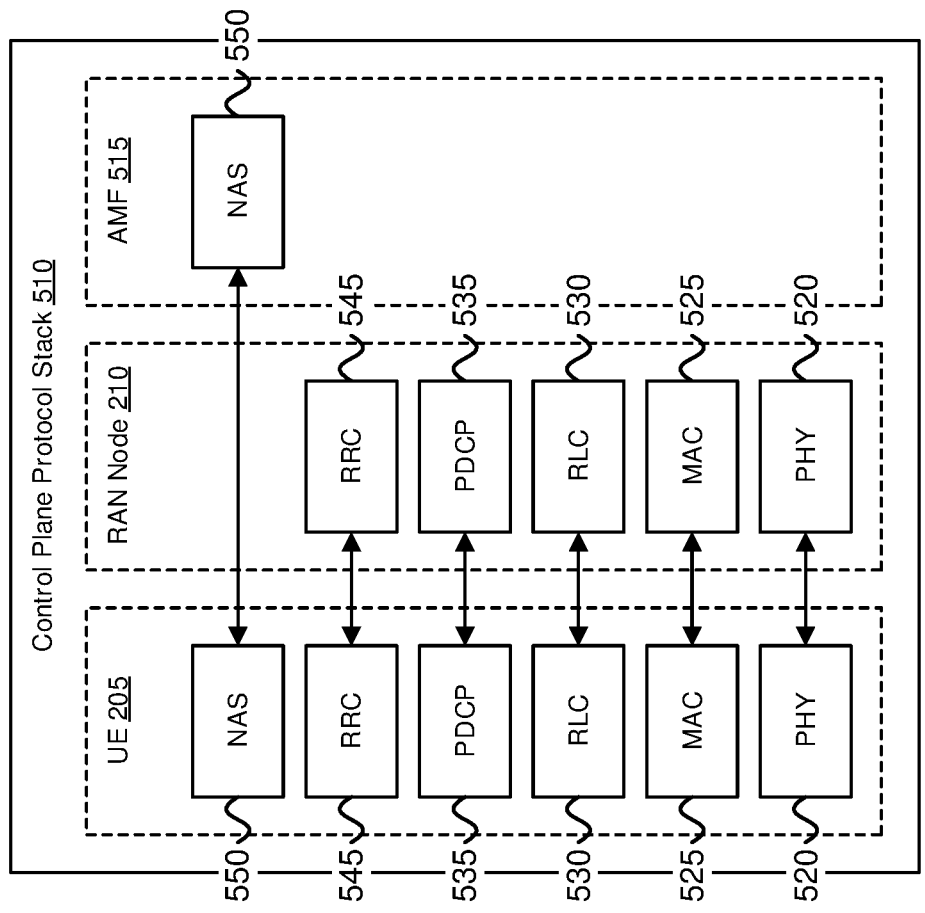
FIG. 5 is a block diagram illustrating one embodiment of a 5G New Radio ("NR") protocol stack.
Figure 5:
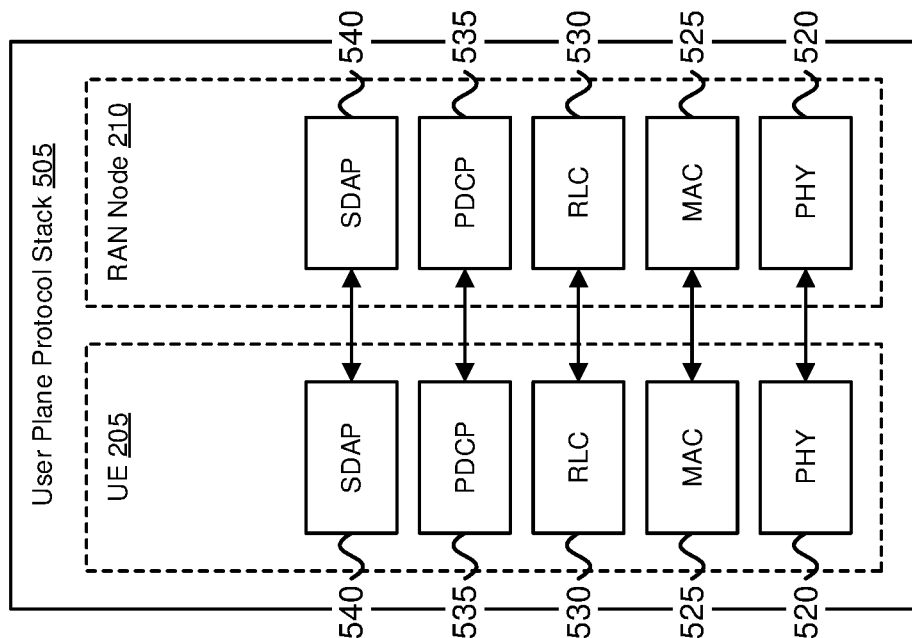

FIG. 5 depicts a NR protocol stack 500, according to embodiments of the disclosure. While FIG. 5 shows the UE 205, the RAN node 210 and an AMF 515 in a 5G core network ("5GC"), these are representative of a set of remote units 105 interacting with a base unit 121 and a mobile core network 140. As depicted, the protocol stack 500 comprises a User Plane protocol stack 505 and a Control Plane protocol stack 510. The User Plane protocol stack 505 includes a physical ("PHY") layer 520, a Medium Access Control ("MAC") sublayer 525, the Radio Link Control ("RLC") sublayer 530, a Packet Data Convergence Protocol ("PDCP") sublayer 535, and Service Data Adaptation Protocol ("SDAP") layer 540. The Control Plane protocol stack 510 includes a physical layer 520, a MAC sublayer 525, a RLC sublayer 530, and a PDCP sublayer 535. The Control Plane protocol stack 510 also includes a Radio Resource Control ("RRC") layer 545 and a Non-Access Stratum ("NAS") layer 550.

The AS layer (also referred to as "AS protocol stack") for the User Plane protocol stack 505 consists of at least SDAP, PDCP, RLC and MAC sublayers, and the physical layer. The AS layer for the Control Plane protocol stack 510 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 545 and the NAS layer 550 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 520 offers transport channels to the MAC sublayer 525. The physical layer 520 may perform CCA/LBT procedure using energy detection thresholds, as described herein. In certain embodiments, the physical layer 520 may send a notification of UL LBT failure to a MAC entity at the MAC sublayer 525. The MAC sublayer 525 offers logical channels to the RLC sublayer 530. The RLC sublayer 530 offers RLC channels to the PDCP sublayer 535. The PDCP sublayer 535 offers radio bearers to the SDAP sublayer 540 and/or RRC layer 545. The SDAP sublayer 540 offers QoS flows to the core network (e.g., 5GC). The RRC layer 545 provides for the addition, modification, and release of Carrier Aggregation and/or Dual Connectivity. The RRC layer 545 also manages the establishment, configuration, maintenance, and release of Signaling Radio Bearers ("SRBs") and Data Radio Bearers ("DRBs").

The NAS layer 550 is between the UE 205 and the 5GC 515. NAS messages are passed transparently through the RAN. The NAS layer 550 is used to manage the establishment of communication sessions and for maintaining continuous communications with the UE 205 as it moves between different cells of the RAN. In contrast, the AS layer is between the UE 205 and the RAN carries information over the wireless portion of the network.

Figure 6:
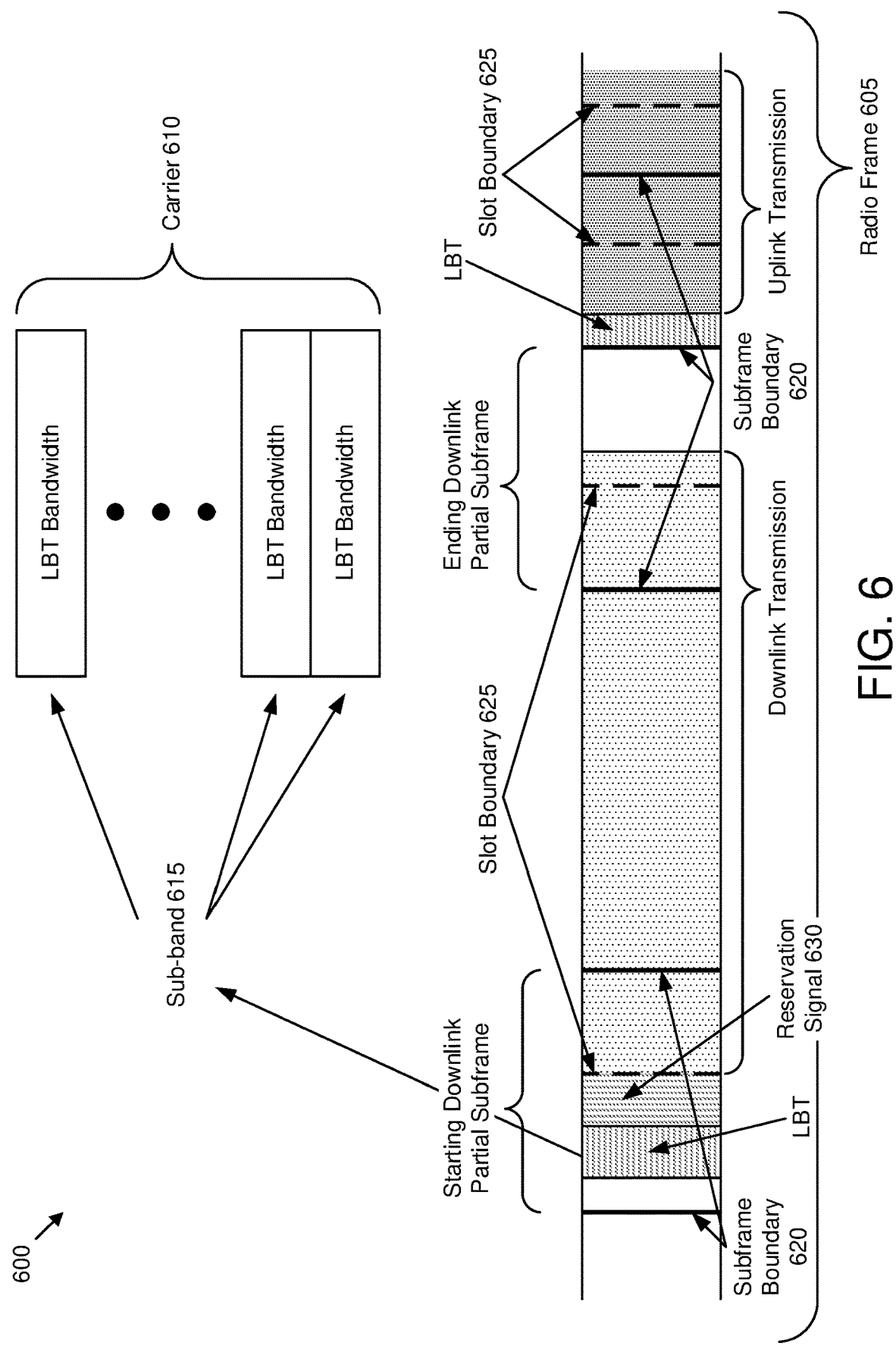
FIG. 6 is a diagram illustrating one embodiment of a radio frame during which LBT procedure is performed.

FIG. 6 depicts an LBT procedure 600 for a radio frame 605 for unlicensed communication, according to embodiments of the disclosure. When a communication channel is a wide bandwidth unlicensed carrier 610 (e.g., several hundred MHz, the CCA/LBT procedure relies on detecting the energy level on multiple sub-bands 615 of the communications channel as shown in FIG. 6. The LBT parameters (such as type/duration, clear channel assessment parameters, etc.) are configured in the UE 205 by the RAN node 210. In one embodiment, the LBT procedure is performed at the PHY layer 230.

FIG. 6 also depicts frame structure of the radio frame 605 for unlicensed communication between the UE 205 and RAN node 210. The radio frame 605 may be divided into subframes (indicated by subframe boundaries 620) and may be further divided into slots (indicated by slot boundaries 625). The radio frame 605 uses a flexible arrangements where uplink and downlink operations are on the same frequency channel but are separated in time. However, the subframes are not configured as a downlink subframe or an uplink subframe and a particular subframe may be used by either the UE 205 or RAN node 210. As discussed previously, LBT is performed prior to a transmission. Where LBT does not coincide with a slot boundary 625, a reservation signal 630 may be transmitted to reserve the channel until the slot boundary is reached and data transmission begins.

Figure 7:
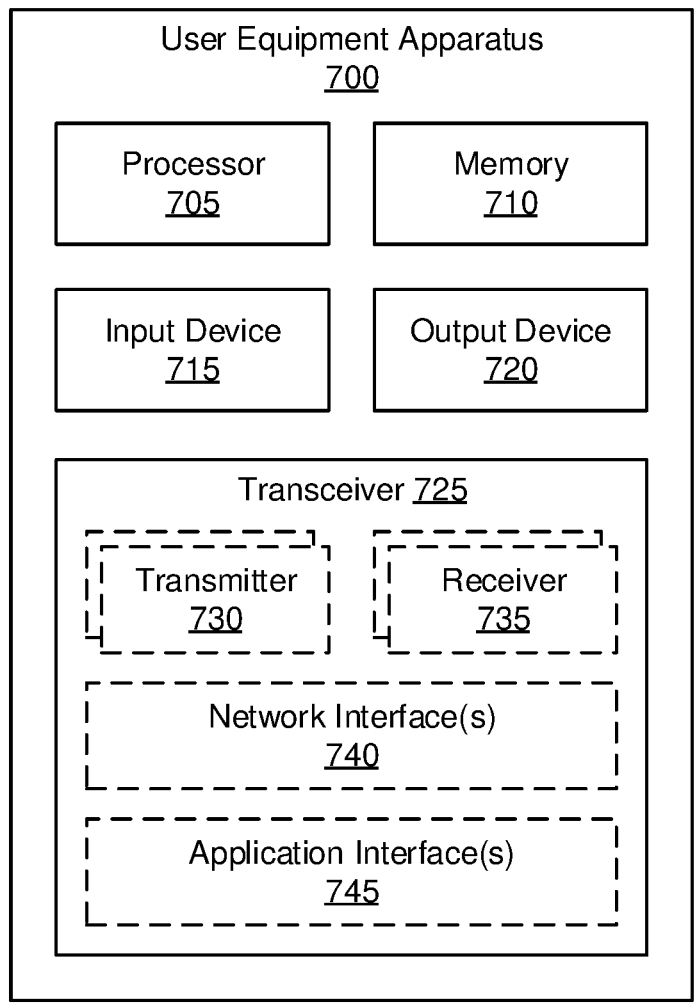
FIG. 7 is a diagram illustrating one embodiment of a user equipment apparatus that may be used for receiver-assisted interference mitigation.

FIG. 7 depicts a user equipment apparatus 700 that may be used for receiver-assisted interference mitigation, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 controls the user equipment apparatus 700 to implement the above described UE behaviors. For example, the processor 705 may generate a first TB for a first UL channel resource. Here, the first TB contains control signaling or data. The processor 705 performs a directional LBT procedure for a first panel/beam associated with the first UL channel resource and transmits request information to a RAN node (e.g., a gNB) using the first UL channel resource in response to successful directional LBT. Via the transceiver 725, the processor 705 receives feedback information from the RAN node in response to the request information and transmits the first TB using the first UL channel resource in response to receiving the feedback information. Note that while the user equipment apparatus 700 is described in terms of performing a LBT procedure for a "panel" from a "set of UE panels," in other embodiments LBT may be performed for a "beam" from a "set of beams." As used herein, the term "panel/beam" (or similar notation) indicates that the description applies to a UE panel and/or beam.

In some embodiments, the transceiver 725 receives (e.g., from the RAN) a first message that configures a plurality of UL channel resources, where each UL channel resource is associated with a panel/beam at the user equipment apparatus 700. In one embodiment, the first message is a UE-specific RRC message. In certain embodiments, the UL channel resources include at least one PUCCH resource and/or at least one PUSCH resource. In one embodiment, a spatial relation for the PUCCH resource is indicated by MAC CE. In one embodiment, a spatial relation for the PUSCH resource is either based on a spatial relation for the PUCCH resource or based on a downlink reference signal (e.g., CSI-RS or any of the DL RS).

In some embodiments, the processor 705 transmits (via the transceiver 725) muting information via sidelink to one or more neighboring UEs. In some embodiments, the processor 705 initiates a timer in response to transmitting the request information. Additionally, the processor 705 stops transmission of the first TB if no feedback information is received before expiry of the timer. In such embodiments, the timer defines a period for monitoring for the feedback information.

In certain embodiments, the processor 705 switches to a second panel/beam in response determining that no feedback information was received before expiry of the timer, performing a second directional LBT procedure for the second panel/beam and transmitting second request information (e.g., after a random back-off time) using the second panel/beam in response to successful direction LBT for the second panel/beam. In certain embodiments, the processor 705 transmits the second request information using the same CG resource as used to transmit the first request information. In other embodiments, the processor 705 transmits the second request information using a different CG resource as used to transmit the first request information.

In some embodiments, the processor 705 performs the directional LBT procedure for the first panel/beam by performing multiple directional LBT procedures simultaneously for a plurality of panels/beams and selecting a set of panels/beams after LBT success, said set comprising the first panel/beam. In such embodiments, the processor 705 transmits the request information by transmitting request information simultaneously on the set of panels/beams.

In certain embodiments, the request information contains a single bit. In certain embodiments, the request information contains at least one of: a panel/beam ID, a CG resource configuration, a channel access priority class, and a LBT type. In certain embodiments, the request information contains a reference sequence (i.e., SRS-like sequence), said reference sequence being previously configured by the RAN node.

In certain embodiments, the request information includes (e.g., short-format) PUCCH/PUSCH/SRS signals. In certain embodiments, the request information contains a demodulation reference signal ("DM-RS"). In certain embodiments, the request information is scrambled using a panel/beam ID corresponding to the first panel/beam. Where multiple panels/beams are used, the processor 705 may scramble the request information sent on each panel/beam using the panel/beam ID corresponding to the panel/beam.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to receiver-assisted interference mitigation. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
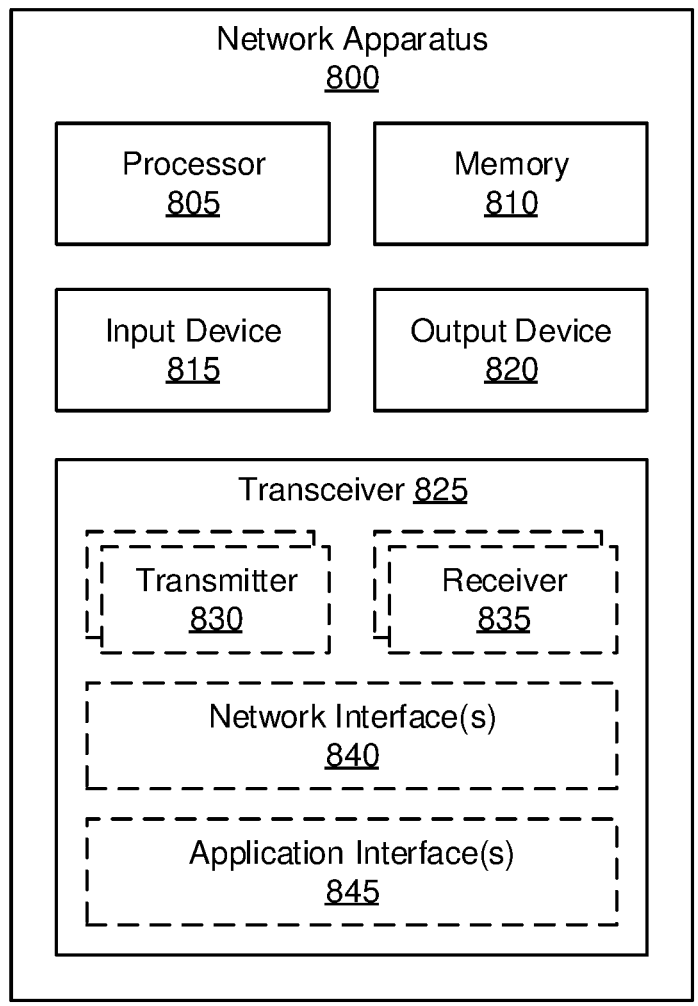
FIG. 8 is a diagram illustrating one embodiment of a network equipment apparatus that may be used for receiver-assisted interference mitigation.

FIG. 8 depicts a network equipment apparatus 800 that may be used for receiver-assisted interference mitigation, according to embodiments of the disclosure. In one embodiment, network equipment apparatus 800 may be one implementation of a RAN node, such as the base unit 121, the RAN node 210, or gNB, described above. Furthermore, the base network equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network equipment apparatus 800 may not include any input device 815 and/or output device 820. In various embodiments, the network equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network equipment apparatus 800 is a RAN node (e.g., gNB) that sends UE configurations and receives measurement reports, as described herein. In such embodiments, the processor 805 controls the network equipment apparatus 800 to perform the above described behaviors. When operating as a RAN node, the processor 805 may include an application processor (also known as "main processor") which manages application-domain and operating system ("OS") functions and a baseband processor (also known as "baseband radio processor") which manages radio functions.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to receiver-assisted interference mitigation. For example, the memory 810 may store parameters, configurations, resource assignments, policies, and the like, as described above. In certain embodiments, the memory 810 also stores program code and related data, such as an operating system or other controller algorithms operating on the remote unit 85.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the PLMN and/or RAN, as described herein. Although only one transmitter 830 and one receiver 835 are illustrated, the network equipment apparatus 800 may have any suitable number of transmitters 830 and receivers 835. Further, the transmitter(s) 830 and the receiver(s) 835 may be any suitable type of transmitters and receivers.

Figure 9:
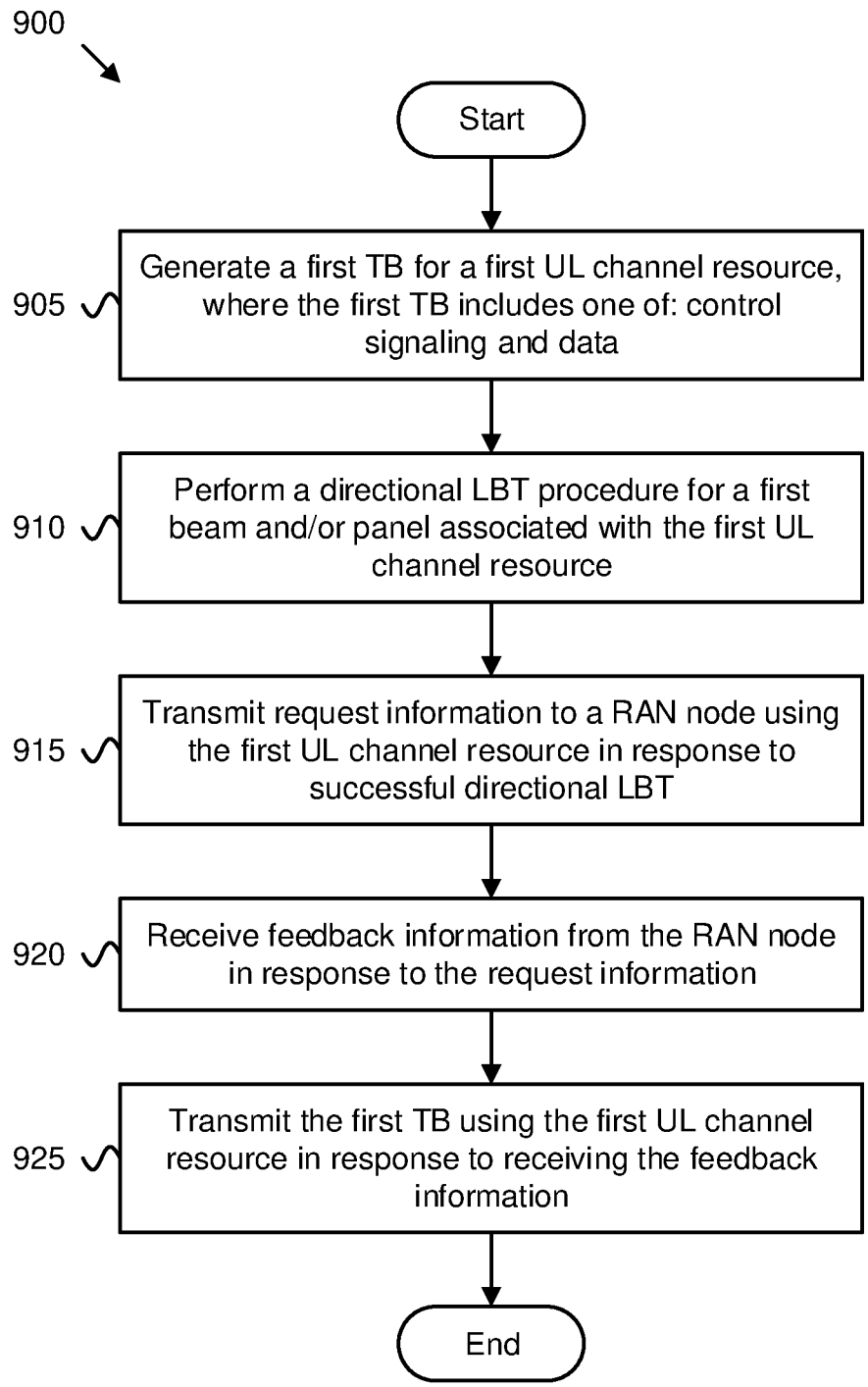
FIG. 9 is a flowchart diagram illustrating one embodiment of a method for receiver-assisted interference mitigation.

FIG. 9 depicts one embodiment of a method 900 for receiver-assisted interference mitigation, according to embodiments of the disclosure. In various embodiments, the method 900 is performed by a user equipment device in a mobile communication network, such as the remote unit 105, the UE 205, and/or the user equipment apparatus 700, described above. In some embodiments, the method 1000 is performed by a processor, such as a microcontroller, a microprocessor, a CPU, a GPU, an auxiliary processing unit, a FPGA, or the like.

The method 900 begins and generates 905 a first TB for a first UL channel resource, where the first TB includes one of: control signaling and data. The method 900 includes performing 910 a directional LBT procedure for a first beam and/or panel associated with the first UL channel resource. The method 900 includes transmitting 915 request information to a RAN node using the first UL channel resource in response to successful directional LBT. The method 900 includes receiving 920 feedback information from the RAN node in response to the request information. The method 900 includes transmitting 925 the first TB using the first UL channel resource in response to receiving the feedback information. The method 900 ends.

Disclosed herein is a first apparatus for receiver-assisted interference mitigation, according to embodiments of the disclosure. The first apparatus may be implemented by a user equipment device in a mobile communication network, such as the remote unit 105, the UE 205, and/or the user equipment apparatus 700, described above. The first apparatus includes a processor and a transceiver that is operable on unlicensed spectrum, wherein the transceiver includes a plurality of UE panels. The processor generates a first TB for a first UL channel resource. Here, the first TB contains control signaling or data. The processor performs a directional LBT procedure for a first panel/beam associated with the first UL channel resource and transmits request information to a RAN node (e.g., a gNB) using the first UL channel resource in response to successful directional LBT. The processor receives feedback information from the RAN node in response to the request information and transmits the first TB using the first UL channel resource in response to receiving the feedback information. Note that while the first apparatus is described in terms of performing a directional LBT procedure(s) and transmissions for a "panel" from a set of "UE panels," in other embodiments the directional LBT procedure(s) and transmissions may be performed for a "beam" from a set of "beams."

In some embodiments, the transceiver receives (e.g., from the RAN) a first message that configures a plurality of UL channel resources, where each UL channel resource is associated with a panel/beam at the UE. In one embodiment, the first message is a UE-specific RRC message. In certain embodiments, the UL channel resources include at least one PUCCH resource and/or at least one PUSCH resource. In one embodiment, a spatial relation for the PUCCH resource is indicated by MAC CE. In one embodiment, a spatial relation for the PUSCH resource is either based on a spatial relation for the PUCCH resource or based on a downlink reference signal (e.g., CSI-RS or any of the DL RS).

In some embodiments, the processor transmits (via the transceiver) muting information via sidelink to one or more neighboring UEs. In some embodiments, the processor initiates a timer in response to transmitting the request information and stops transmission of the first TB if no feedback information is received before expiry of the timer. In such embodiments, the timer defines a period for monitoring for the feedback information.

In certain embodiments, the processor switches to a second panel/beam in response determining that no feedback information was received before expiry of the timer, performing a second directional LBT procedure for the second panel/beam and transmitting second request information (e.g., after a random back-off time) using the second panel/beam in response to successful direction LBT for the second panel/beam. In certain embodiments, transmitting the second request information includes using the same CG resource as used to transmit the first request information. In other embodiments, transmitting the second request information includes using a different CG resource as used to transmit the first request information.

In some embodiments, performing the directional LBT procedure for the first panel/beam includes performing multiple directional LBT procedures simultaneously for a plurality of panels/beams and selecting a set of panels/beams after LBT success, said set comprising the first panel/beam. In such embodiments, transmitting the request information includes transmitting request information simultaneously on the set of panels/beams.

In certain embodiments, the request information contains a single bit. In certain embodiments, the request information contains at least one of: a panel/beam ID, a CG resource configuration, a channel access priority class, and a LBT type. In certain embodiments, the request information contains a reference sequence (i.e., SRS-like sequence), said reference sequence being previously configured by the RAN node.

In certain embodiments, the request information includes (e.g., short-format) PUCCH/PUSCH/SRS signals. In certain embodiments, the request information contains a DM-RS. In certain embodiments, the request information is scrambled using a panel/beam ID corresponding to the first panel/beam.

Disclosed herein is a first method for receiver-assisted interference mitigation, according to embodiments of the disclosure. The first method may be performed by a user equipment device in a mobile communication network, such as the remote unit 105, the UE 205, and/or the user equipment apparatus 700. The first method includes generating a first TB for a first UL channel resource (i.e., PUCCH/PUSCH resource). Here, the first TB contains one of: control signaling and data. The first method includes performing a directional LBT procedure for a first beam associated with the first UL channel resource and transmitting request information to a RAN node (e.g., gNB) using the first UL channel resource in response to successful directional LBT. The first method includes receiving feedback information from the RAN node in response to the request information and transmitting the first TB using the first UL channel resource in response to receiving the feedback information. Note that while the first method is described in terms of performing a LBT procedure and transmission for a "beam" from a set of "beams," in other embodiments the LBT procedure and transmission may be performed for a "panel" from a set of "UE panels."

In some embodiments, the first method includes receiving (e.g., from the RAN) a first message that configures a plurality of UL channel resources, where each UL channel resource is associated with a beam at the UE. In one embodiment, the first message is a UE-specific RRC message. In certain embodiments, the UL channel resources include at least one PUCCH resource and/or at least one PUSCH resource. In one embodiment, a spatial relation for the PUCCH resource is indicated by MAC CE. In one embodiment, a spatial relation for the PUSCH resource is either based on a spatial relation for the PUCCH resource or based on a downlink reference signal (e.g., CSI-RS or any of the DL RS).

In some embodiments, the first method includes transmitting muting information via sidelink to one or more neighboring UEs. In some embodiments, the first method includes initiating a timer in response to transmitting the request information and stopping transmission of the first TB if no feedback information is received before expiry of the timer. In such embodiments, the timer defines a period for monitoring for the feedback information.

In certain embodiments, the first method includes switching to a second beam in response determining that no feedback information was received before expiry of the timer, performing a second directional LBT procedure for the second beam and transmitting second request information (e.g., after a random back-off time) using the second beam in response to successful direction LBT for the second beam. In certain embodiments, transmitting the second request information includes using the same CG resource as used to transmit the first request information. In other embodiments, transmitting the second request information includes using a different CG resource as used to transmit the first request information.

In some embodiments, performing the directional LBT procedure for the first beam includes performing multiple directional LBT procedures simultaneously for a plurality of beams and selecting a set of beams after LBT success, said set comprising the first beam. In such embodiments, transmitting the request information includes transmitting request information simultaneously on the set of beams.

In certain embodiments, the request information contains a single bit. In certain embodiments, the request information contains at least one of: a beam ID, a CG resource configuration, a channel access priority class, and a LBT type. In certain embodiments, the request information contains a reference sequence (i.e., SRS-like sequence), said reference sequence being previously configured by the RAN node.

In certain embodiments, the request information includes (e.g., short-format) PUCCH/PUSCH/SRS signals. In certain embodiments, the request information contains a DM-RS. In certain embodiments, the request information is scrambled using a beam ID corresponding to the first beam.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:
    generating a first transport block ("TB") for a first uplink ("UL") channel resource;
    performing a directional listen-before-talk ("LBT") procedure for a first beam associated with the first UL channel resource;
    transmitting, to a radio access network ("RAN") node, request information using the first UL channel resource in response to successful directional LBT, wherein the request information comprises a previously configured sounding reference signal ("SRS") sequence;
    receiving, from the RAN node, feedback information in response to the request information; and
    transmitting the first TB using the first UL channel resource in response to receiving the feedback information.

2. The method of claim 1, further comprising receiving a first message that configures a plurality of UL channel resources, wherein each UL channel resource is associated with a beam at the UE.

3. The method of claim 2, wherein the first message is a UE-specific radio resource control ("RRC") message.

4. The method of claim 2, wherein the UL channel resources include at least one physical uplink control channel ("PUCCH") resource and/or at least one physical uplink shared channel ("PUSCH") resource, where a spatial relation for the PUCCH resource is indicated by medium access control ("MAC") Control Element ("CE") and a spatial relation for the PUSCH resource is based on one of: the spatial relation for the PUCCH resource, or a downlink reference signal.

5. The method of claim 1, further comprising;
    initiating a timer in response to transmitting the request information, wherein the timer defines a period for monitoring for the feedback information; and
    stopping transmission of the first TB if no feedback information is received before expiry of the timer.

6. The method of claim 5, wherein the request information comprises first request information, the method further comprising:
    switching to a second beam in response determining that no feedback information was received before expiry of the timer;
    performing a second directional LBT procedure for the second beam; and
    transmitting second request information using the second beam in response to successful direction LBT for the second beam.

7. The method of claim 6, wherein transmitting the second request information comprises using a same configured grant ("CG") resource as used to transmit the first request information.

8. The method of claim 6, wherein transmitting the second request information comprises using a different configured grant ("CG") resource than used to transmit the first request information.

9. The method of claim 1, wherein performing the directional LBT procedure for the first beam comprises performing multiple directional LBT procedures simultaneously for a plurality of beams and selecting a set of beams after LBT success, the set of beams comprising the first beam, wherein transmitting the request information comprises transmitting request information simultaneously on the set of beams.

10. The method of claim 1, wherein the request information comprises a single bit.

11. The method of claim 1, wherein the request information comprises one or more of: a beam identifier ("ID"), a configured grant ("CG") resource configuration, a channel access priority class, or a LBT type.

12. The method of claim 1, wherein the request information comprises a demodulation reference signal ("DM-RS").

13. The method of claim 1, wherein the request information is scrambled using a beam identifier corresponding to the first beam.

14. The method of claim 1, further comprising transmitting muting information in sidelink to one or more neighboring UEs.

15. A user equipment ("UE") for wireless communication, comprising:
    a transceiver operable on unlicensed spectrum, wherein the transceiver comprises a plurality of UE panels;
    at least one memory; and
    at least one processor coupled with the at least one memory and configured to cause the UE to:
    generate a first transport block ("TB") for a first uplink ("UL") channel resource;
    perform a directional listen-before-talk ("LBT") procedure for a first panel associated with the first UL channel resource;
    transmit, to a radio access network ("RAN") node, request information using the first UL channel resource in response to successful directional LBT, wherein the request information comprises a previously configured sounding reference signal ("SRS") sequence;
    receive, from the RAN node, feedback information in response to the request information; and
    transmit the first TB using the first UL channel resource in response to receiving the feedback information.

16. The UE of claim 15, wherein the request information comprises a single bit.

17. The UE of claim 15, wherein the request information comprises one or more of: a beam identifier ("ID"), a configured grant ("CG") resource configuration, a channel access priority class, or a LBT type.

18. The UE of claim 15, wherein the request information comprises a demodulation reference signal ("DM-RS") or a reference sequence previously configured by the RAN node.

19. The UE of claim 15, wherein the processor is configured to cause the UE to transmit muting information in sidelink to one or more neighboring UEs.

* * * * *